May 29, 1928.  
H. MULLENDORE  
1,671,777  
FEEDING MECHANISM FOR HOPPERS  
Filed Jan. 22, 1926  
2 Sheets-Sheet 1
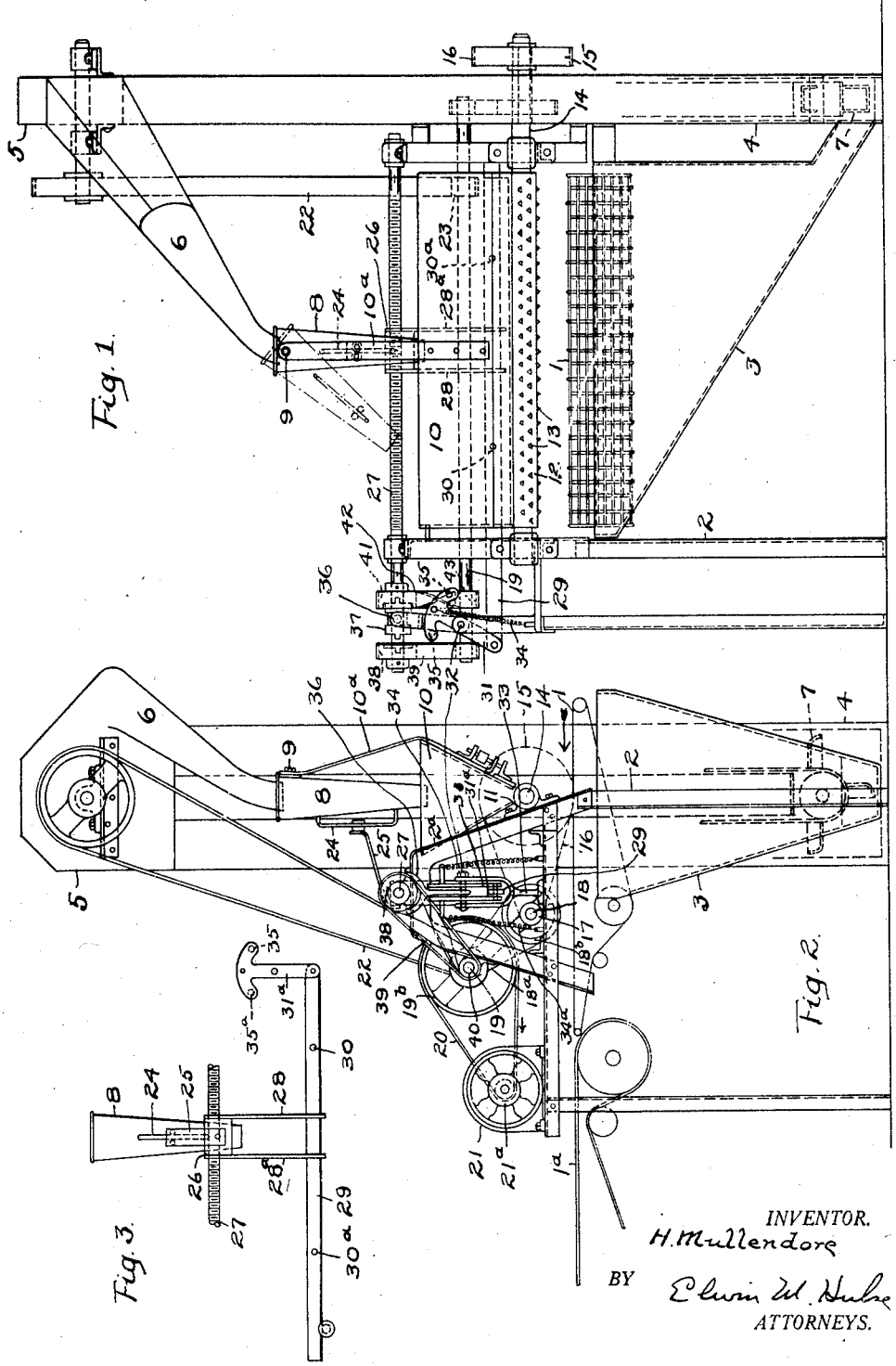
INVENTOR.  
H. Mullendore  
BY  
ATTORNEYS.

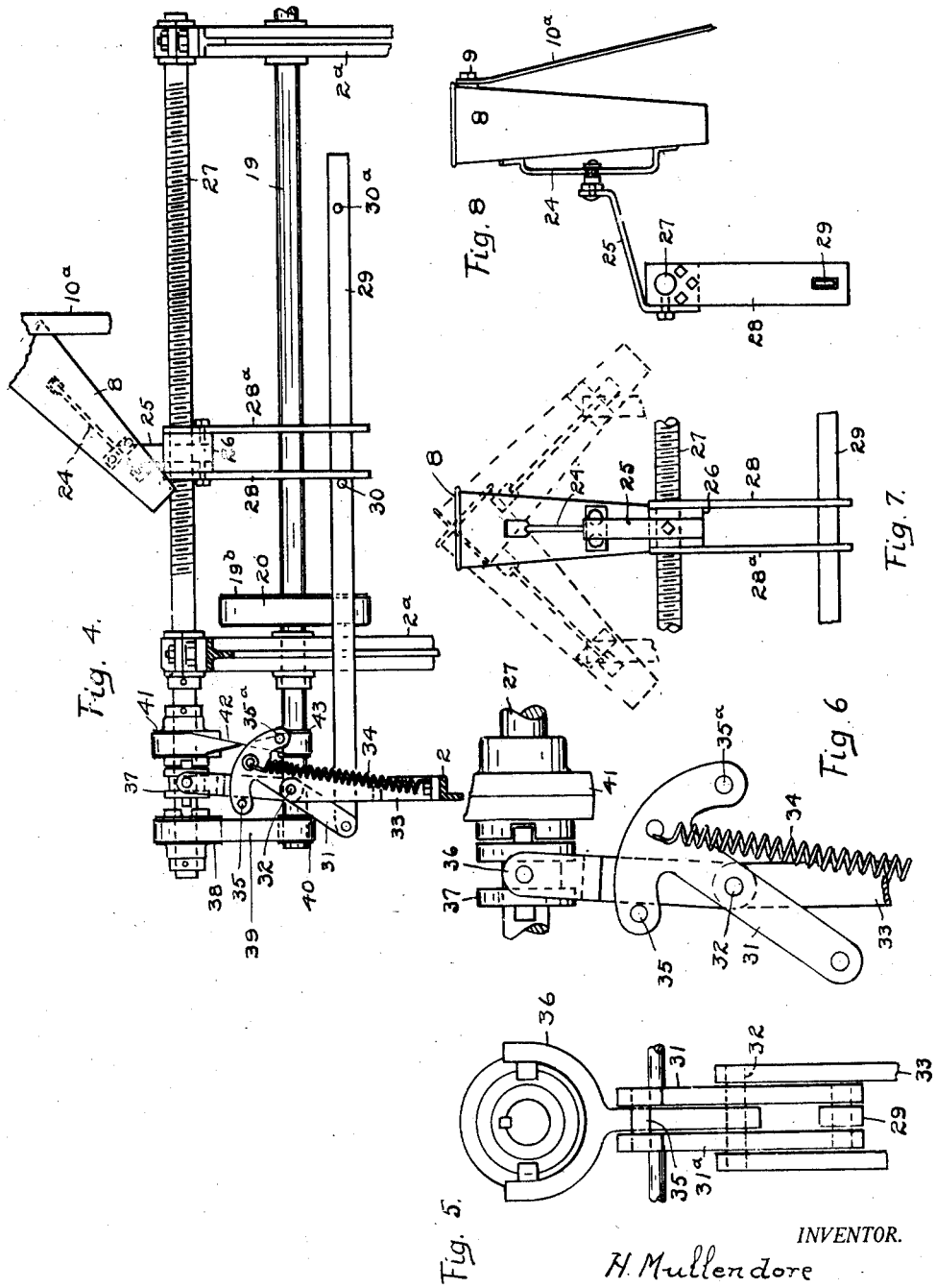

Patented May 29, 1928.

UNITED STATES PATENT OFFICE.

1,671,777

HARVEY MULLENDORE, OF FORT WAYNE, INDIANA, ASSIGNOR TO PERFECTION BISCUIT COMPANY, OF FORT WAYNE, INDIANA, A CORPORATION.

FEEDING MECHANISM FOR HOPPERS.

Application filed January 22, 1926. Serial No. 83,067.

The invention relates generally to devices for depositing materials upon cakes and other bakery goods wherein the goods are conveyed under a hopper from which materials, such as nuts, are caused to descend onto the goods to form a top coating on the goods and the invention is directed particularly to means by which the materials are fed to the hopper.

The object of the invention is to provide a machine of the class described with simple and efficient means by which materials may be fed into a hopper in an even bed so that an even discharge of the materials from the hopper is effected to coat uniformly a multiplicity of goods carried beneath the hopper. Another object is to provide the machine with novel means by which the coating materials that do not engage on the goods travelling beneath the hopper are collected and automatically conveyed back to the feeding mechanism.

An embodiment of the invention is illustrated in the accompanying drawings in which:

Figure 1 is a front elevational view of a coating machine having the invention applied thereto; Fig. 2 a side elevational view of the same; Fig. 3 an elevational view of a fraction of the spout oscillating mechanism; Fig. 4, an enlarged elevational view of the spout shifting mechanism; Fig. 5 an end view of the clutch mechanism; Fig. 6 a side view of the same; Fig. 7 a rear view of the spout and operating attachments therefor and Fig. 8 a side view of the same.

In the illustrative embodiment of the invention the machine is designed to deposit materials, such as peanuts, upon cakes or cookies that are prepared or iced to engage the nuts. An endless belt or conveyor 1 is suitably supported on the main frame 2 and is suitably driven in the direction of the arrow, the goods to be coated being fed or placed on the belt with their sticky sides uppermost. A second endless belt or other form of conveyor 1ª, receives the coated goods from the belt 1 and carries them to a desired point. The belt 1 is preferably perforated such as a wire screen of suitable mesh to permit such of the materials as do not lodge on the goods to pass through it and into the hopper 3. From this hopper 3 the coating materials pass into the lower end of a conduit 4 which communicates at its upper end with a receptacle 5 having a chute 6 projecting outwardly and downwardly therefrom. An endless conveyor 7 is mounted in the conduit by which the materials are continuously elevated to the receptacle 5 and the chute 6. A spout 8 is pivoted at 9 to a bracket 10ª that projects upwardly from the middle point of the feeding hopper 10. This hopper is suitably suspended on the frame 2 over the belt 1 and extends transversely across the belt. It is preferably V-shape in cross-section and the bottom is open to form a discharge slot 11 for the hopper.

A feed roller 12 having projections 13 on its periphery is revolubly mounted adjacent to the slot 11, its shaft 14 having a pulley 15 thereon engaged by a belt 16. The belt 16 also engages a pulley 17 secured to a counter-shaft 18 that is driven by a belt 18ª which engages a pulley 18ᵇ on said shaft 18 and also a pulley on a countershaft 19. A belt 20 engages a pulley 19ᵇ on the shaft 19 and also a pulley 21ª on the armature shaft of an electric motor 21. The conveyor 7 is driven by a belt 22 that is engaged on a pulley 23 fixed on the shaft 19.

Since the hopper 10 is relatively long it is desired to distribute the feed of coating materials in an even bed throughout the length of the hopper so that the feed roller 12 will cause a film of the coating materials extending substantially across the belt 1 to descend onto the goods to be coated. To accomplish this even bed of the feed in the hopper 10 the spout 8 is pivoted adjacent to the hopper as above described and it is oscillated over the hopper by the following described mechanism. A bracket 24 is secured to the spout upon which is slidably engaged an arm 25 that is secured to a travelling member 26 engaged on a screw 27 revolubly mounted on the frame 2, or the extension 2ª thereof. Two arms 28 and 28ª depend from the traveller, their lower ends being adjacent a bar 29 that is mounted for longitudinal reciprocation. Two pins 30 and 30ª project from the bar at selected points which are adapted to be abutted by the arms 28, 28ª respectively. One end of the bar 29 is pivoted to the lower ends of two levers 31, 31ª, which levers are pivoted at 32 to a yoke frame 33 secured to the main frame 2.

Springs 34, 34ª are suitably attached at their upper ends to the upper ends of the levers 31, 31ª respectively and also to the main frame 2, and either or each lever carries two pins 35, 35ª that project inwardly and are adapted to alternately abut the opposite edges of a yoke 36, the lower end of which yoke is loosely mounted on the pivot 32. The distance between the pins 35, 35ª is predetermined and is greater than the width of the yoke 36 so that the levers will swing a selected distance before the pin 35 or 35ª will abut the yoke. The upper end of this yoke 36 is pivotally connected to opposite sides of a clutch member 37 that is slidably secured to the screw 27 and is adapted to engage a clutch pulley 38 loosely mounted on the screw 27 and driven by a belt 39 that engages a pulley 40 on the shaft 19. The clutch member 37 is also adapted to engage a clutch pulley 41 loosely mounted on the screw 27 and driven in the opposite direction to that of the pulley 38 by a cross belt 42 that engages a pulley 43 also secured to the shaft 19. The clutch pulleys 38 and 41, therefore, rotate constantly in opposite directions and the screw 27 is driven first in one direction and then the other as the clutch member is shifted into successive engagement with them.

Assuming that the belt 20 is driven in the direction indicated by the arrow and the clutch member 37 is in engagement with the clutch pulley 41, the screw is rotated counter-clockwise (Fig. 2) by the cross belt 42. The traveller 26, therefore, moves away from the pulley 41 carrying the spout 8 with it. When the arm 28ª on the traveller abuts the pin 30ª on the bar 29, the bar is caused to reciprocate to the right (Fig. 1). The bar, therefore, swings the levers toward the left and the pin 35ª eventually engages the yoke 36 and rocks it to cause the clutch member to move or snap into engagement with the clutch pulley 38. The bar 29 has nearly reached the limit of its throw by the time the pin 35ª abuts the yoke 36, and the levers by that time have been rocked to a point where the upper end of the springs have passed beyond the center or beyond the vertical plane of the pivotal point of the levers. The pin 35ª causes the yoke 36 to disconnect the clutch member from the clutch pulley 41 and the springs cause the said member to snap or move rapidly into engagement with the clutch pulley 38 to cause the screw to rotate in the opposite direction, and thereby cause the spout to swing toward the opposite end of the hopper. The oscillations of the spout are continued in the above manner so long as the machine is in operation. The conveyer 7 continuously carries the surplus coating materials that drop through the conveyer belt 1 to the receptacle 5 and the chute 6 directs the materials to the spout that swings back and forth to form the even bed of the materials in the hopper.

What I claim is:

In a machine of the class described the combination with a conveyer and a hopper disposed above and transversely to the conveyer and adapted to deliver materials to the conveyer, of a swinging conductor supported on the hopper, means to feed the materials to the conductor, a revoluble screw, a follower on the screw and having a connection to the conductor for swinging the same, two loose pulleys on the screw adapted to drive the screw in opposite directions, a clutch mechanism to connect either pulley to the screw, a reciprocable member connected to the clutch mechanism and having longitudinally spaced lugs thereon and means on the follower and slidably engaging the said member and adapted to engage the lugs alternately at predetermined points of time to reciprocate said member and cause the clutch mechanism to engage the pulleys alternately.

HARVEY MULLENDORE.